United States Patent [19]

York et al.

[11] 4,166,211

[45] Aug. 28, 1979

[54] ERROR CONTROL SYSTEM FOR NAMED DATA

[75] Inventors: Kenneth L. York, Huntingdon Valley; Peter R. Annal, West Chester; John E. Legory, Paoli, all of Pa.

[73] Assignee: Burroughs Corporation, Detroit, Mich.

[21] Appl. No.: 893,068

[22] Filed: Apr. 3, 1978

[51] Int. Cl.$^2$ ............................................. G06F 11/10
[52] U.S. Cl. ..................................... 235/312; 364/200
[58] Field of Search ................. 235/312; 364/200, 900

[56] References Cited

U.S. PATENT DOCUMENTS

| | | | |
|---|---|---|---|
| 3,825,893 | 7/1974 | Bossen et al. | 235/312 X |
| 4,005,405 | 1/1977 | West | 235/312 X |
| 4,051,461 | 9/1977 | Hashimoto et al. | 364/200 |

*Primary Examiner*—David H. Malzahn
*Attorney, Agent, or Firm*—Edward J. Feeney, Jr.; Edmund M. Chung; Leonard C. Brenner

[57] ABSTRACT

An error control system for named data functions in a hierarchical memory system environment requiring only a single error-control encoding for each data word used therein. Each level of memory in the hierarchy thereof includes a data word storage device preceded by an error checking circuit to validate and correct when possible data to be stored therein. A translator operates upon the data name of the data word to be stored to indicate the area or portion of the storage device in which the data word is to be stored. A directory table associates data names with data word locations in the storage device, and a search mechanism fed by the translator searches the directory table in the area or portion so indicated for a data word location in the storage device to store the data word. If a data word is not located in one level of memory, the next lower level of memory is searched for same. Data words may be stored and translated or shifted through the various levels of memory without further error control encoding thereof. Fetching occurs in essentially the reverse manner of storing with the caveat that the single encloder used for storing is replaced by a decoder or error checking circuit.

4 Claims, 3 Drawing Figures

ERROR CONTROL SYSTEM FOR NAMED DATA

BACKGROUND OF THE INVENTION

In the environment of a data processing system with hierarchical memory, the present invention relates to an error control system for named data.

In the prior art many error detecting and error correcting codes have been evolved to insure the integrity of the data to be processed. Generic to all of these codes is redundancy, wherein additional bits are added to the data bits as a function thereof to permit an algorithm controlling the check bits to be recomputed as desired for error detection and possible correction.

One class of codes, known as single error correction, double error detection (SEC/DED) is described by R. W. Hamming in "Error Detecting and Error Correcting Codes," Bell Systems Technical Journal, 29, 1950, pages 147-160.

In the preferred embodiment thereof, the present invention utilizes an error control code of that class although more or less sophisticated codes could likewise be used.

It is also well known in stored program systems to encode not only the information content of a data word stored therein, but also to encode the physical address of the data word along with the data word. While the encoded word consists of data, physical address, and check bits, only the data and check bits are stored. Thus, data stored at incorrect addresses as well as incorrect data bits are readily detectable. See for example, L. S. Tuomenoksa, U.S. Pat. No. 3,231,858 issued Jan. 25, 1966.

However, the prior art systems such as that typified by Tuomenoksa do not function well in a hierarchical memory system since a different encoding would be required for each level of memory due to addressing changes at each level. Furthermore, the error control mechanisms therein described would not provide a continuity check on both the data word and its associated address as the data word is transferred from one level of memory to another and back again to the data source or other elements external to the memory system. The continuity check would not exist because code conversion would be required as data passed from one memory level to another.

Therefore, it is an object of the present invention to provide an improved error control system for hierarchical memory environments.

It is a further object of the invention to provide in a hierarchical memory environment an improved error control system for encoding information relating both to the information of data words and to the address associated therewith.

It is yet another object of the invention to provide an error control system covering both data and associated addressing information in a hierarchical memory environment requiring solely a single encoding for each data word and assuring continuity checking on information transferring between memory levels.

It is still yet another object of the invention to provide an error control system for a hierarchical memory environment having capability for inherent detection of errors incurred in address translation, in transfer of data between memory levels and in fetching of wrong data.

SUMMARY OF THE INVENTION

The above and other objects of the invention are realized by an error control system for named data which functions in a hierarchical memory system environment and yet requires only a single error control encoding for each data word used therein. Each level of memory in the hierarchy thereof includes a data word storage device preceded by an error checking circuit to validate and correct when possible data to be stored therein. Also included in each level is a translator for operating upon the data name of the data word to be stored to indicate the area or portion of the storage device in which the data word is to be stored, a directory table for associating data names with data word locations in the storage device, and a search mechanism fed by the translator to search the directory table in the area or portion so indicated for a data word location in the storage device to store the data word. If a data word is not located in one level of memory, the next lower level of memory is searched for same. Data words may be stored and translated or shifted through the various levels of memory without further error control encoding thereof. Fetching occurs in essentially the reverse manner of storing with the caveat that the single encoder used for storing is replaced by a decoder or error checking circuit. Data security is provided since the data name associated with a data word must be known in order to fetch that data word.

The system configuration and operational details given above have been presented in simplified form. Other features of the invention will become more fully apparent in the drawings and detailed description presented hereinafter.

DESCRIPTION OF THE PREFERRED EMBODIMENT

The error control for named data system of the present invention functions for both storing and fetching operations. For purposes of illustration, the storing operation will be detailed first followed by a description of the fetching operation.

Figure 1:
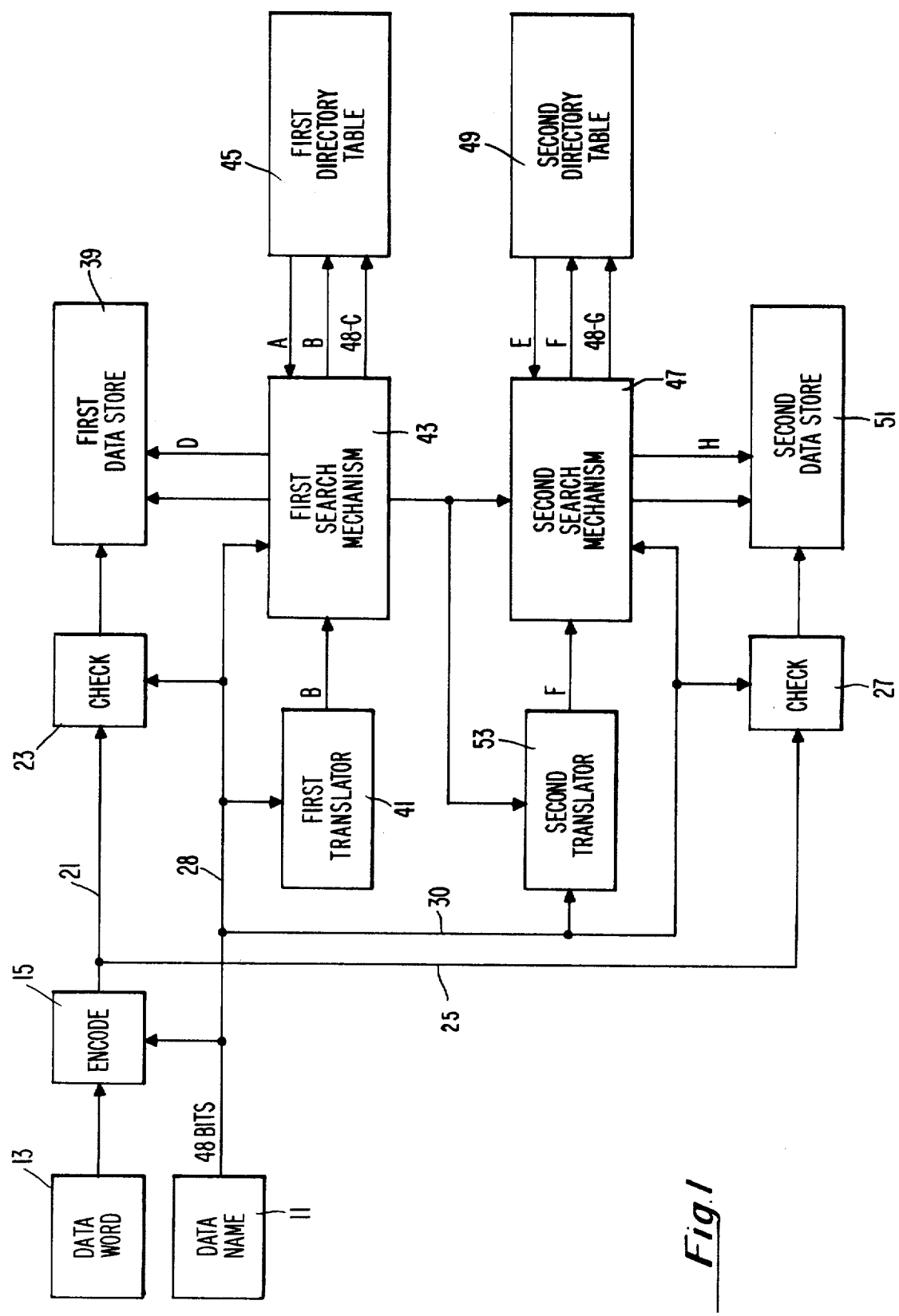
FIG. 1 is a diagram depicting a data word storing operation in the error control for named data system of the present invention.

With reference to FIG. 1, it can be seen that a data name source device 11 is associated with a data word source device 13. Whenever a new data word (or program variable) is created by the data word source device 13, the data name source device 11 generates a unique name to be permanently associated therewith. As used herein "data" is synonomous with "information" and in the preferred embodiment, a data word is 54 bits in length and a data name is 48 bits long.

Figure 2:
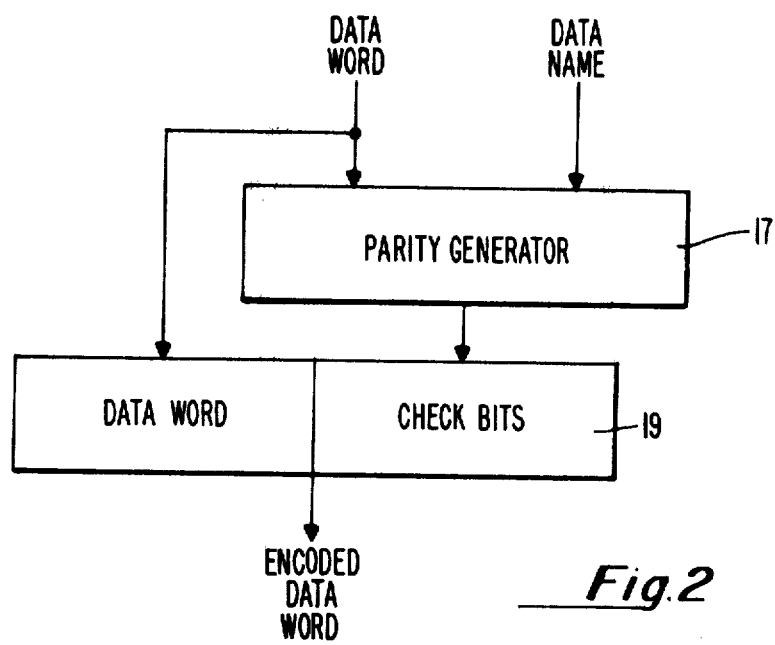
FIG. 2 is a diagram showing an encoder used in the system of FIG. 1.

New data word values and their names are fed to an encoder 15. The encoder 15, see FIG. 2, includes a parity generator circuit 17 which generates check bits for either a pure error detection code or preferably a combined detection and correction code (e.g., a Hamming type code). In the preferred embodiment the encoder 15 generates a 10-bit combined detection and correction code. The encoder 15 outputs from a store register 19 a concatenated encoded word comprising the 54-bit data word and the generated 10-bit parity check.

With reference again to FIG. 1, the encoder 15 feeds its outputs through a first transmission line 21 to a first checking circuit 23 and through a second transmission line 25 to a second checking circuit 27. Also fed along third and fourth transmission lines 28 and 30 to the first and second checking circuits 23 and 27 is the 48-bit data name associated with the encoded data word fed on the first and second transmission lines 21 and 25.

Figure 3:
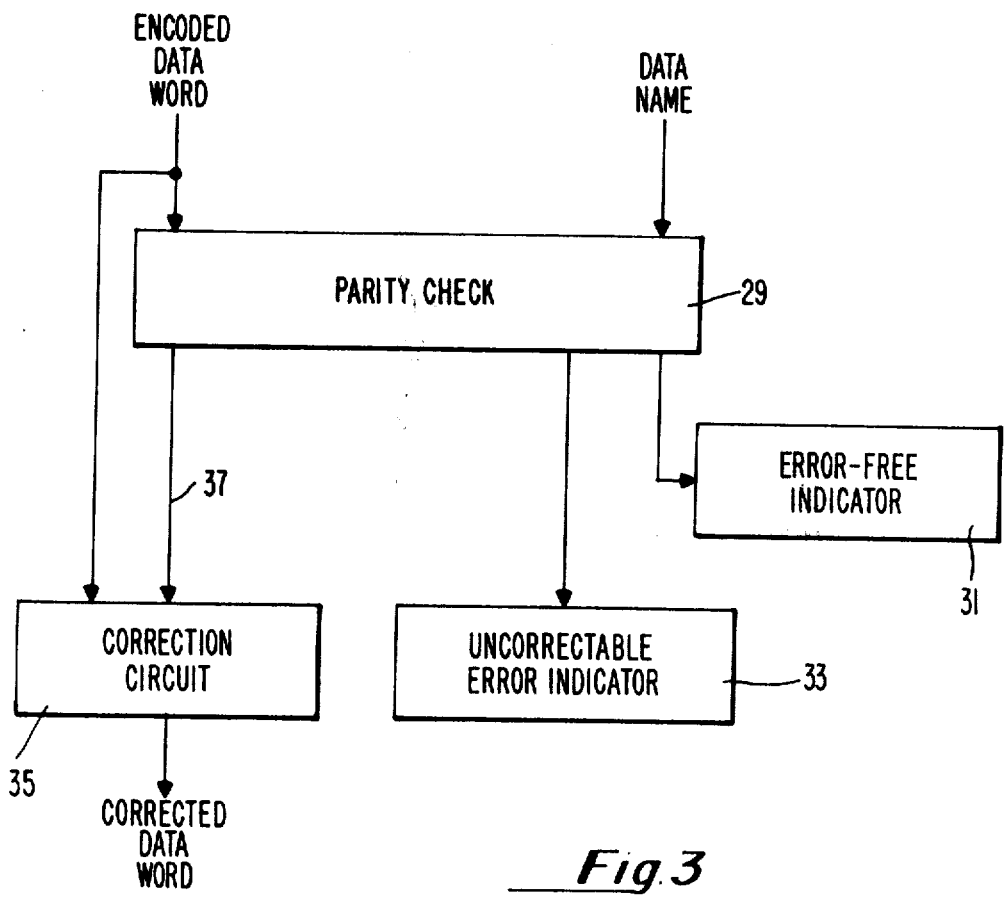
FIG. 3 is a diagram illustrating a checker having error correction capabilities used in the system of FIG. 1.

The first and second checking circuits 23 and 27 are identical, see FIG. 3, and in the preferred embodiment include a parity checking circuit 29, an error-free indicator circuit 31, an uncorrectable error indicator circuit 33, and a correction circuit 35. The parity checking circuit 29 receives the 64 encoded word bits from the store register 19 in the encoder 15 and the associated 48 data name bits. Parity checking is performed upon the received bits and as a result thereof an indication or flag is sent when appropriate to an error-free indication circuit 31 which functions in effect to indicate "everything is O.K., proceed with storing operation." Conversely, if an even error or other uncorrectable error is uncovered by the parity checking circuit 29, then an indication or flag is sent to the uncorrectable error indicator 33 to initiate appropriate action thereto. Finally, the 64 encoded data word bits are fed to an error correction circuit 35 which also receives error bit location information from the parity checking circuit 29 when a correctable error is uncovered therein. The correction circuit 35 corrects the erroneous bit at the bit location received and outputs a corrected data word for further processing. Only the data word and not the data name is corrected (if correctable) by the correction circuit 35.

With reference again to FIG. 1, once a data word is checked through the first checking circuit 23, it is ready for storage in the first data storing means 39. The first data storing means 39 is a relatively small, high speed memory and is physically implemented with high speed devices such as bi-polar devices.

Addressing for the first storage memory 39 is derived by a first translator 41 from the 48-bit data name associated with the data word to be stored. Storage memory 39 contains 2 raised to the power "D" word locations. Thus, the physical address of the data word to be stored in storage memory 39 is specified by a D-bit address field wherein D is less than 48, the data name length in bits. The D-bit address field is comprised of three subfields which are A, B, and C bits in length, respectively. Suitable values for A, B, C and D are 2, 7, 3 and 12 bits each respectively. However, different values may be chosen to suit various embodiments and first storage memory 39 sizes. The A subfield represents the high order bits of the D field and C the low order bits. The translator 41 operates upon the received 48-bit data name and outputs a B-bit address which specifies not a specific address location in the first storage memory 39 but rather a plurality of such addresses which may be considered a portion (or a class) of the memory 39. The translation performed in the first translator 41 may be a simple B-bit truncation of the 48-bit data name input, or it may be performed by means of a translation algorithm developed to satisfy a particular application or environmental criteria. It is important to the preferred embodiment of the present invention only that a 48-bit data name input be translated into a particular associative B-bit output which represents an area of storage in the first storage means 39.

The first translator 41 feeds the B-bit output field to the first search mechanism 43 which also receives the associated 48-bit data name. The data name is used in searching a directory table 45 which keeps track of groups (pages) of data names stored in the first data storing means 39.

The search is done on the high order 48-C bits of the data name and the area of the directory table that is searched is specified by the B-bit field. All data names having in common their first 48-C bits belong to the same page. The output of the search operation is the A-bit address which locates the desired data name page relative to the specified class in the directory table 45. There are 2 raised to the power "A" page locations per class in the directory table 45. The desired data name is specified relative to its page by the C-bit field. The C-bit field is comprised of the C low order bits of the 48-bit data name. The physical address of the data name to be stored in memory 39 is now completely specified by the D-bit (D=A+B+C) address output from the search mechanism 43 and the translator 41.

If the page to which the data name to be stored belongs is found by search mechanism 43, then the associated data word is written into the first memory 39 at the address specified by the D-bit output from search mechanism 43 and translator 41. If the page is not present in directory table 45, then an attempt is made to locate the page of data words in the next lower level of memory, namely the second data storing means 41, and to bring the page of data words to first memory 39 and the page name to directory table 45. To make room, vacant positions in both first memory 39 and first directory table 45 are located or if necessary created. In directory table 45 one vacant space must be made available among the 2 raised to the power "A" page name entries in the class specified by the B-bit field output from first translator 41. In first memory 39, 2 raised to the power "C" vacant spaces must be made available for the page of data words containing the data word location to which the store will be made. If a vacancy does not already exist in first memory 39, a vacancy is created by selecting from first directory table 45 a page name to be removed. The algorithm used for the selection process may be either the least-recently-used replacement algorithm or the random replacement algorithm, or any other algorithm well known in the literature.

The page of data words in first memory 39 corresponding to the page name selected for replacement can simply be erased if a copy of them exists in a lower level of memory. If a copy does not exist elsewhere, then the page must be transferred to second memory 51 for storage at addresses specified by 2 raised to the power "C" H-bit addresses wherein H=E+F+G and "H" is less than 48. The address subfields E, F, and G are similar respectively to subfields A, B, and C in the first level of memory; however, the magnitudes differ respectively from those of A, B, and C. Suitable values have been found to be H=19, E=6, F=6, and G=7. Different values may of course be found advantageous in alternate embodiments of the present invention. The attempted store operation to second memory 51 is handled in the same way that store operations to first memory 39 are handled. At the second level or some lower level of memory space will be found for storing the page of data words displaced from first memory 39. When this operation is completed the page of 2 raised to the power C data words containing the originally referenced data word are located in second memory 51 (or if not there a lower level of memory) and transferred to first memory 39. First directory table 45 is then updated with the inclusion of the page name of the page of data words just stored in first memory 39. The store operation to the originally referenced data word location can now be completed.

The second storage means 51 is similar in nature and operation to the first data storing means 39 except that the second data storage means 51 is a larger, generally slower, and therefore, less expensive on a per-bit basis than the first storage means 39. The second data storage means 51 has associated with it a second search mechanism 47, a second directory table 49, and a second translator 53. The second search mechanism 47, directory table 49, and translator 53 function in a manner identical to that described for the first translator 41, first search mechanism 43, and first directory table 45. Also associated with the data storing means 51 is a second checking circuit 27 which functions identically to the first checking circuit 23.

Each level of memory in this invention has a different physical address for the same data name, yet only one encoding performed by encoder 15 is necessary when a new data word is created and stored. A separate code checker (first code checker 23 and a second code checker 27) is used at the end of transmission just prior to the actual store operation.

Figure 4:
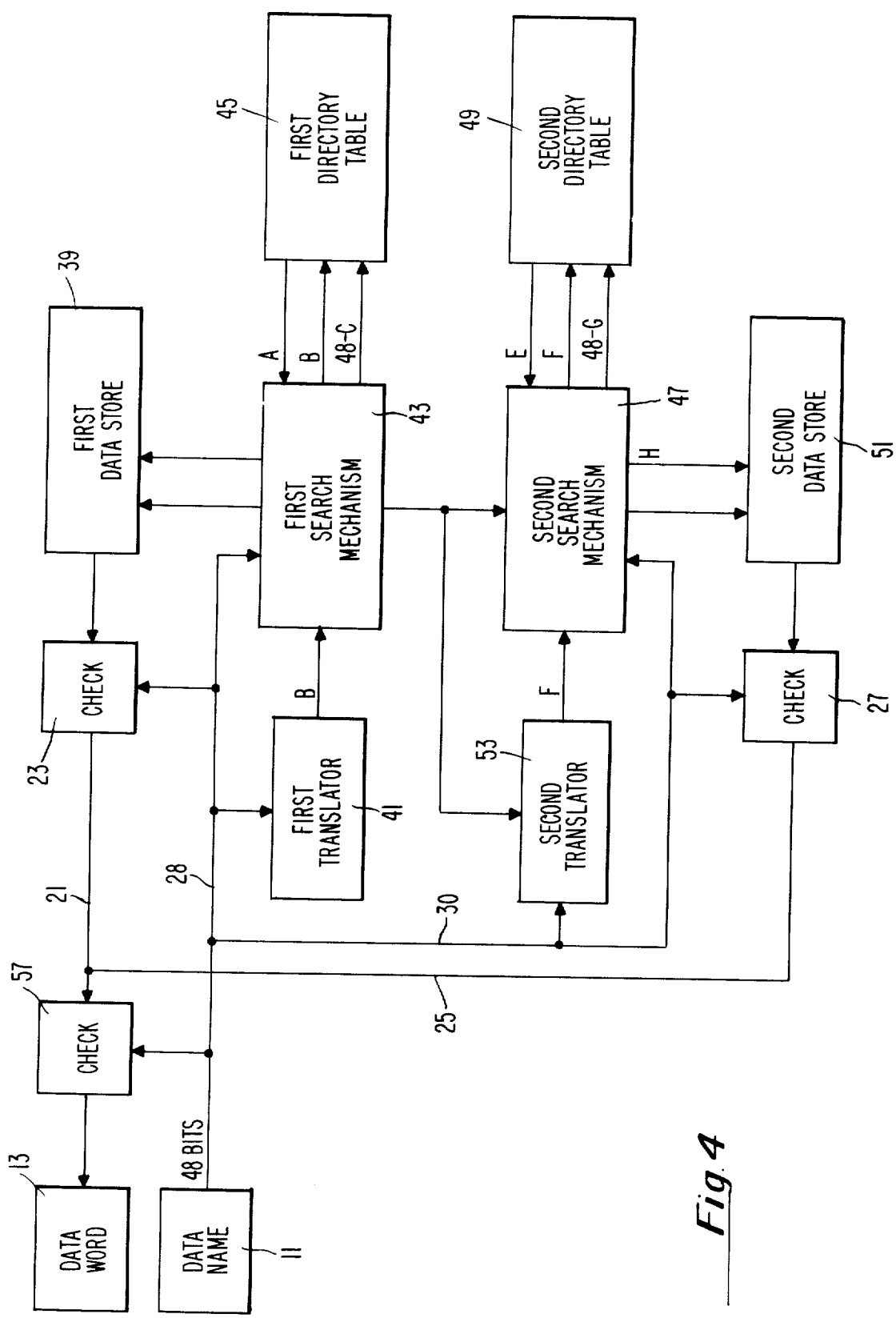
FIG. 4 is a diagram depicting a data word fetching operation in the error control for named data system of the present invention.

Comparing now FIG. 4 with FIG. 1, it can be seen that a fetch operation requires the same circuitry as a store operation with the exception that a third checking circuit 57 replaces the encoder 15. The third checking circuit 57 functions identically to the first and second checking circuits 23 and 27. The fetch operation functions in a manner similar to the above-described store operation. To fetch a data word, the associated data name is transmitted to the first translator 41 which generates in effect, information relating to that portion of the first directory table 45 which should be searched to find that data name. The first search mechanism 43 then performs that search and if the data name is found in a first directory table 45, its location in the data storing means 39 is used to fetch the associated data word from the first data storing means 39 and back through the second checker 23 to the first transmission line 21, to the third checking circuit 57 and finally to the data word source 13. If the data name is not in the first directory table 45, a search begins through the second directory table 49 to locate its page in the second storage means 51. It is appreciated that for purposes of program initiation, all data names are stored before the running of a program in the lowest order directory table.

Although the illustrations of the above-described embodiment show only two levels of memory storage, it is appreciated that the principles utilized may be extended to three or more levels of storage. Furthermore, other modifications and embellishments may be made to the above-described embodiment as desired for particular applications. For example, elegant replacement or swapping algorithms or means may be included for swapping data back and forth between the first data storing means 39 and the second data storing means 51. Also, if desired, data could be written into both data storing means 39 and data storing means 51 in a single operation. It should be further understood that the word size, name size, and data storing means sizes are provided for means of illustration only. Obviously larger or smaller systems may be developed as desired.

Thus while the invention has been particularly shown and described with reference to a preferred embodiment, it will be understood by those skilled in the art that various changes in form and detail may be made therein without departing from the spirit of the invention.

What is claimed is:

1. An error control system for named data words comprising:

encoder means inputted by a data word and its associated data name for generating a concatenated encoded word comprising the data word inputted thereto and a generated parity check;

first check means fed by said encoder means and by said data name associated with said concatenated encoded word generated by said encoder means, said first check means for providing a parity check upon said concatenated encoded word;

first store means fed by said first check means for storing within said concatenated encoded word checked by said first check means, said first store means having a plurality of storage portions, each storage portion therein having a plurality of storage locations, each storage location therein for storing a concatenated encoded word;

first translator means receiving said associated data name and operative thereupon for specifying a particular portion in said first storage means for storing said concatenated word checked by said first check means;

first locating means fed by said first translator means and by said data name associated with said concatenated encoded word and operative thereupon for specifying a particular storage location within said particular portion in said first storage means specified by said first translator means for storage of said concatenated encoded word;

second check means fed by said encoder means and by said data name associated with said concatenated encoded word generated by said encoder means, said second check means for providing a parity check upon said concatenated encoded word;

second store means fed by said second check means for storing within said concatenated encoded word checked by said second check means, said second store means having a plurality of storage portions, each storage portion therein having a plurality of storage locations, each storage location therein for storing a concatenated encoded word;

second translator means receiving said associated data name and operative thereupon for specifying a particular portion in said second storage means for storing said concatenated word checked by said second check means; and second locating means fed by said second translator means and by said data name associated with said concatenated encoded word and operative thereupon for specifying a particular storage location within said particular portion in said second storage means specified by said second translator means for storage of said concatenated encoded word.

2. The error control system for named data words according to claim 1 wherein
said first storage means includes a relatively small high-speed memory; and
said second storage means includes by comparison to said first storage means a relatively larger lower-speed memory.

3. The error control system for named data words according to claim 1 or claim 2 wherein:
said encoder means generates a parity check sufficient for correction of at least one bit errors in said inputted data word and for detection for errors in said associated data name.

4. The error control system for named data words according to claim 1 or 2 wherein
said first locating means includes a first directory table for storing pages of data names associated with concatenated encoded words stored in said first storage means, and a first search mechanism for searching said first directory table for a particular page of data names; and
said second locating means includes a second directory table for storing pages of data names associated with concatenated encoded words stored in said second storage means, and a second search mechanism for searching said second directory table for a particular page of data names.

* * * * *